United States Patent
Rupp et al.

(10) Patent No.: US 10,478,780 B2
(45) Date of Patent: Nov. 19, 2019

(54) SEPARATING DEVICE FOR SEPARATING AT LEAST ONE UNDESIRED FLUID FROM A LIQUID, MEMBRANE OF A SEPARATING DEVICE, FILTER, FILTER ELEMENT, AND LIQUID SYSTEM

(71) Applicant: MANN+HUMMEL GmbH, Ludwigsburg (DE)

(72) Inventors: Heike Rupp, Stuttgart (DE); Steffen Schuetz, Bietigheim-Bissingen (DE); Dagmar Winkler, Filderstadt (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 12 days.

(21) Appl. No.: 15/685,120

(22) Filed: Aug. 24, 2017

(65) Prior Publication Data

US 2017/0354933 A1    Dec. 14, 2017

Related U.S. Application Data

(63) Continuation of application No. PCT/EP2016/053671, filed on Feb. 22, 2016.

(30) Foreign Application Priority Data

Feb. 27, 2015   (DE) ........................ 10 2015 002 494

(51) Int. Cl.
*B01D 63/08* (2006.01)
*F02M 37/24* (2019.01)
(Continued)

(52) U.S. Cl.
CPC ........... *B01D 63/08* (2013.01); *B01D 17/085* (2013.01); *B01D 36/008* (2013.01); *B01D 63/04* (2013.01);
(Continued)

(58) Field of Classification Search
None
See application file for complete search history.

(56) References Cited

U.S. PATENT DOCUMENTS 4,073,626 A * 2/1978 Simmons .............. C07F 15/025
44/367
5,271,842 A    12/1993 Degen et al.
(Continued)

FOREIGN PATENT DOCUMENTS

| DE | 10138695 A1 | 2/2003 | |
| DE | 10302057 A1 | 7/2004 | |
| EP | 2784299 A1 * | 10/2014 | ............. F02M 33/00 |

*Primary Examiner* — Chester T Barry
(74) *Attorney, Agent, or Firm* — James Hasselbeck

(57) ABSTRACT

A separating device for separating an undesired fluid from a multi-component liquid has a region flowed through by the multi-component liquid and at least one membrane disposed in the region to separate a first fluid region from a second fluid region. The membrane has a first permeability to the undesired fluid and a second permeability to the multi-component liquid. The first permeability is different from the second permeability. The membrane is equally permeable to all components of the multi-component liquid. The membrane is permeable to the multi-component liquid and impermeable to the undesired fluid, or the membrane is impermeable to the multi-component liquid and is permeable to the undesired fluid, wherein the multi-component liquid is a liquid multi-component operating medium. A filter with such a separating device and a filter element, in particular for diesel fuel, as well as a liquid system with such a separating device are described.

17 Claims, 3 Drawing Sheets

(51) Int. Cl.
*B01D 17/00* (2006.01)
*F01M 1/10* (2006.01)
*B01D 36/00* (2006.01)
*B01D 63/04* (2006.01)
*B01D 69/02* (2006.01)
*B01D 69/06* (2006.01)
*B01D 69/08* (2006.01)
*F01M 11/03* (2006.01)
*F02M 37/00* (2006.01)

(52) U.S. Cl.
CPC .............. *B01D 69/02* (2013.01); *B01D 69/06* (2013.01); *B01D 69/08* (2013.01); *F01M 1/10* (2013.01); *F01M 11/03* (2013.01); *F02M 37/24* (2019.01); *B01D 2315/08* (2013.01); *B01D 2315/10* (2013.01); *B01D 2325/36* (2013.01); *B01D 2325/38* (2013.01); *F01M 2001/1028* (2013.01); *F02M 37/0052* (2013.01)

(56) References Cited

U.S. PATENT DOCUMENTS

| | | | |
|---|---|---|---|
| 7,914,852 B2* | 3/2011 | Belz | G02B 6/032 427/379 |
| 9,546,626 B2* | 1/2017 | LaForge | F02M 37/221 |
| 2010/0293841 A1* | 11/2010 | Zuckerman | C10L 1/14 44/325 |
| 2014/0290610 A1 | 10/2014 | Cordatos et al. | |
| 2015/0122720 A1 | 5/2015 | Boiger et al. | |

* cited by examiner

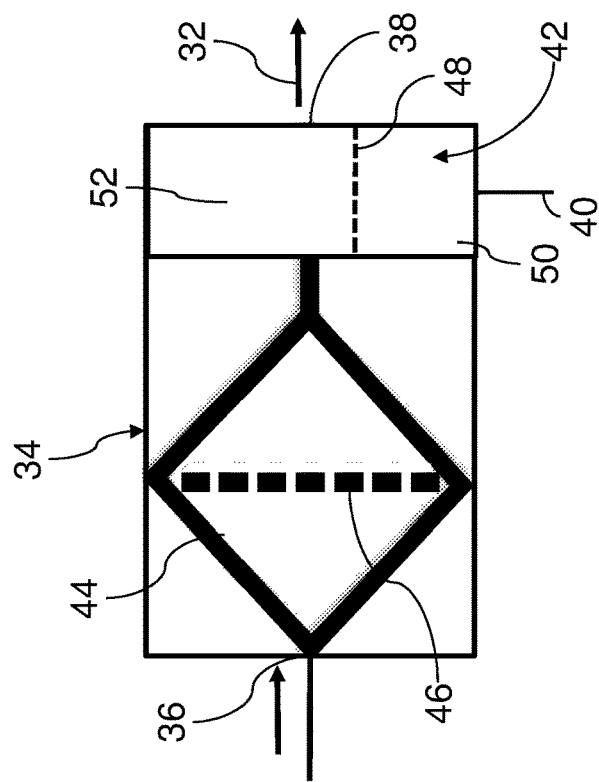
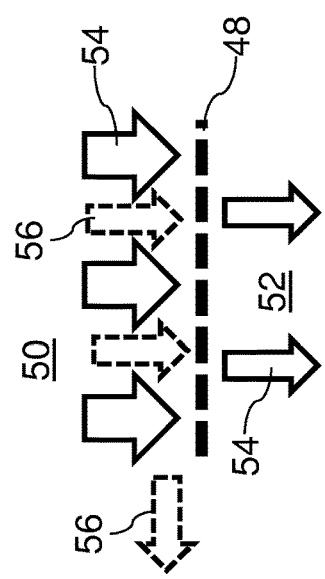
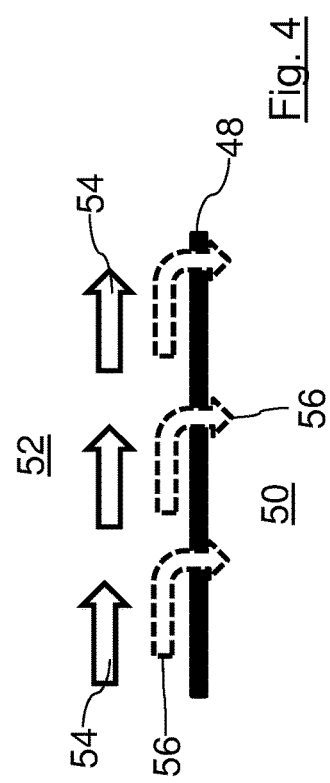
Fig. 3
Fig. 2
Fig. 4

SEPARATING DEVICE FOR SEPARATING AT LEAST ONE UNDESIRED FLUID FROM A LIQUID, MEMBRANE OF A SEPARATING DEVICE, FILTER, FILTER ELEMENT, AND LIQUID SYSTEM

CROSS-REFERENCE TO RELATED APPLICATIONS

This application is a continuation application of international application No. PCT/EP2016/053671 having an international filing date of 22 Feb. 2016 and designating the United States, the international application claiming a priority date of 27 Feb. 2015, based on prior filed German patent application No. 10 2015 002 494.9, the entire contents of the aforesaid international application and the aforesaid German patent application being incorporated herein by reference.

BACKGROUND OF THE INVENTION

The invention concerns a separating device for separating at least one undesired fluid from at least one liquid, in particular fuel, oil, water or aqueous urea solution, in particular of a filter for the at least one liquid, in particular of an internal combustion engine, in particular of a motor vehicle.

Moreover, the invention concerns a membrane of a separating device for separating at least one undesired fluid from at least one liquid, in particular fuel, oil, water or aqueous urea solution, in particular of a filter for the at least one liquid, in particular of an internal combustion engine, in particular of a motor vehicle.

Furthermore, the invention concerns a filter for at least one liquid, in particular fuel, oil, water or aqueous urea solution, in particular of an internal combustion engine, in particular of a motor vehicle, comprising at least one part of a separating device for separating at least one undesired fluid from the at least one liquid.

Apart from that, the invention also concerns a filter element of a filter for at least one liquid, in particular fuel, oil, water or aqueous urea solution, in particular of an internal combustion engine, in particular of a motor vehicle, comprising at least one part of a separating device for separating at least one undesired fluid from the at least one liquid.

Finally, the invention concerns a liquid system for at least one liquid, in particular fuel, oil, water or aqueous urea solution, in particular of an internal combustion engine, in particular of a motor vehicle, comprising at least one separating device for separating at least one undesired fluid from the at least one liquid.

DE 103 02 057 A1 discloses a fuel filter, in particular a diesel filter. The fuel filter comprises a fuel inlet, a fuel outlet, and means for separating and removing water contained in the fuel from the fuel filter. In order to simplify the removal of the separated water from the fuel filter and to enable in particular a continuous discharge of the water, a semipermeable membrane is provided by means of which the water can be discharged from the fuel.

The invention has the object to design a separating device, a membrane, a filter, a filter element, and a liquid system of the aforementioned kind in which a variety of employable liquids and/or separable undesired fluids can be increased. Moreover, an efficient and simple separation of the at least one liquid and of the at least one undesired fluid is to be enabled.

SUMMARY OF THE INVENTION

This object is solved according to the invention in that the membrane is permeable to at least one liquid multi-component operating medium of an internal combustion engine and is impermeable to at least one undesired fluid comprising in particular water, or vice versa.

That the at least one membrane has different permeability to the at least one undesired fluid and the at least one liquid with all its components means that it is either impermeable to the at least one undesired fluid and is permeable to the at least one liquid with all its components, or vice versa. In this context, the at least one membrane is equally permeable to all components of the at least one liquid. Accordingly, it can be impermeable to all components of the at least one liquid or can be permeable to all components of the at least one liquid. In this way, it can be made possible that the components of the liquid cannot be separated from each other.

According to the invention, the at least one membrane is capable of keeping together the components of a multi-component liquid and of separating therefrom possibly present undesired media that can be entrained by the at least one liquid. In this way, even multi-component liquids can be treated with the separating device. In this context, none of the components of the liquid is allowed to pass or be retained differently than the other components of the liquid.

According to the invention, by means of the at least one membrane, the at least one undesired fluid and the at least one liquid can be separated from each other in a single stage and the at least one undesired fluid can be removed. The at least one membrane can fulfill the separating function and the removal function simultaneously. In this way, no additional separating or removing means is required as is the case in the fuel filter known in the art. Here, means for separating the water from the fuel, on the one hand, and a membrane for removing the water, on the other hand, are required.

Advantageously, the at least one membrane can be free of fleece-like material. Alternatively, the at least one membrane can be fleece-like or can comprise a fleece-like material.

Advantageously, the at least one membrane can be designed as a lifetime component. Other parts, in particular the remaining ones, of the separating device, in particular of the filter, can be designed as lifetime components.

Advantageously, the at least one membrane, in particular when matched to the employed at least one liquid and/or the at least one undesired fluid, can be designed such that it cannot irreversibly act, in particular physically and/or chemically interact or co-act, with any of the components of the at least one liquid. In this way, it can be prevented that properties of the at least one membrane will be changed, in particular that its function will be impaired. Also, it can be prevented in this way that the at least one liquid, in particular one of its components, will be changed in its composition and/or its properties by contact with the at least one membrane.

Depending on the type of operation of the separating device, the at least one membrane can be designed such that the at least one liquid with all its components can be retained in the at least one first fluid region. The first fluid region can be referred to as a retentate chamber or retentate side. Correspondingly, the at least one undesired fluid can pass through the at least one membrane into the at least one second fluid region which can be referred to as permeate chamber or permeate side. Conversely, the at least one liquid can also pass through the at least one membrane into the second fluid region and the at least one undesired fluid can be retained in the first fluid region.

Advantageously, at least one membrane can be flowed through by the at least one liquid according to a flow-through principle, the so-called dead-end flow-through principle. The at least one membrane can be arranged in the flow path of the at least one liquid so as to be mandatorily flowed through. The at least one liquid can flow against the membrane substantially perpendicularly. The at least one undesired fluid can be retained by the membrane. The first fluid region can advantageously be connected with an inlet for the at least one liquid. The second fluid region can be connected with an appropriate outlet for the at least one liquid. The first fluid region can additionally be provided with an outlet by means of which the at least one undesired fluid can be drained from the first fluid region.

Alternatively or additionally, the at least one liquid can flow against the at least one membrane according to a transverse flow principle, the so-called cross-over flow principle or cross-flow principle. The at least one liquid and the at least one undesired fluid can flow substantially transversely, in particular parallel, to an inflow surface of the at least one membrane or flow across it. Due to the flow across the at least one membrane, shearing forces can be produced which reduce the formation of a cover layer and in this way can reduce, in particular prevent, blocking of pores. The clogging risk or failure risk can thus be reduced. Moreover, a separating efficiency can be improved. Pressure loss in the system, in particular of the separating device and/or the filter, can be reduced.

Advantageously, with the cross-flow principle, the at least one liquid with all its components can be retained. The at least one liquid can flow off across the inflow surface. The at least one undesired fluid can flow through the at least one membrane and can be separated. For this operating principle, the at least one fluid region, on the one hand, can be connected with the inlet for the at least one liquid and, on the other hand, with the outlet. The second fluid region can comprise the drain for the separated at least one undesired fluid.

Alternatively, in the cross-flow principle the at least one liquid can flow through the at least one membrane. The at least one undesired fluid can then be retained by the at least one membrane and can flow off across the inflow surface. In this case, the outlet for the at least one liquid can be connected with the second fluid region. The drain for the at least one undesired fluid, on the other hand, can be connected with the first fluid region, in particular at a side which is fluidically opposite the inlet.

In contrast to the dead-end flow-through principle, in the cross-flow principle a pressure loss on the side of the at least one liquid can be reduced.

The separating device operated according to the cross-flow principle can be used in open flow.

Operating the at least one membrane according to the cross-flow principle, in particular according to the variant in which the at least one undesired fluid is retained, can be particularly advantageous in fuel systems in particular in fields of use with very high water contents in the fuel that is to be separated from the fuel, in particular diesel fuel, in particular in case of marine diesel engines.

Advantageously, vacuum or low pressure can be applied on the permeate side of the at least one membrane. In this way, the separation of the undesired fluid can be further improved.

Advantageously, the at least one undesired fluid can be separated from the at least one liquid by means of pervaporation across the at least one membrane. In this way, the separation, in particular the separating quality and/or the separating efficiency, can be further improved.

At least one membrane can be arranged in a main flow or full flow of a liquid system, in particular of a fuel system or motor oil circuit. Alternatively or additionally, at least one membrane can be arranged in an auxiliary flow, an auxiliary branch or a bypass of the liquid system.

The separating device can advantageously be part of a filter for the at least one liquid or can be combined therewith. The separating device can be integrated at least partially into the filter.

Advantageously, at least one part of the separating device, in particular the at least one membrane, can be arranged downstream or upstream of a filter, in particular of a filter medium of the filter.

Advantageously, at least one part of the separating device can be combined with at least one filter element of the filter or can be realized by it.

Advantageously, the at least one membrane can be combined with the filter medium. Advantageously, the at least one membrane can be integrated into the filter medium. Advantageously, the at least one membrane can also have a filter function. The filter medium can alternatively comprise the membrane function.

The at least one filter element can be arranged exchangeably in an openable filter housing. Alternatively, it can be embodied to be exchangeable together with a filter housing, as a so-called spin-on filter.

Advantageously, the filter housing can comprise at least one inlet and at least one outlet for the at least one liquid. Advantageously, the filter element can separate the at least one inlet from the at least one outlet.

Advantageously, the at least one filter element can be designed as a hollow filter element, in particular as a so-called round filter element. In case of a hollow filter element, the filter medium surrounds at least one element interior relative to an element axis circumferentially and at least partially closed. Alternatively, the at least one filter element can be designed as a filter element without element interior, in particular as a so-called flat filter element.

At least one part of the separating device can be combined with a main liquid filter and/or a prefilter and/or a final filter of the liquid system or can be appropriately integrated therein.

Alternatively or additionally, at least one separating device can be arranged, separate from possibly present filters, in particular in another conduit section of the liquid system, in particular of a fuel system or of a motor oil circuit.

At least one of the components of the multi-component liquid can be at least one additive, at least one auxiliary material and/or at least one adjuvant or can comprise one. Additives, which can also be referred to as auxiliary materials or adjuvants, are materials that can be added to other liquid components, in particular, fuel or motor oil, in small quantities in order to achieve or improve certain properties. Additives can be used in order to provide a positive effect on manufacture, storage, processing or properties of the liquid prior to, during and/or after the phase of use.

The separating device can advantageously be arranged in a liquid conduit of an internal combustion engine of a motor vehicle. The at least one separating device can be part of a fuel system or of a motor oil circuit of an internal combustion engine.

However, the invention is not limited to internal combustion engines of motor vehicles. Rather, it can also be used in other types of internal combustion engines, in particular industrial motors or stationary motors. It can also be arranged outside or separate of internal combustion engines in other areas of motor vehicles. It can also be used independent of internal combustion engines and motor vehicles.

The invention can be used in motor vehicles, in particular land vehicles, watercraft and/or aircraft, machines, in particular construction machines or agricultural machines, in particular tractors. It can be used in passenger cars or commercial vehicles, in particular trucks, or ships.

The invention can also be used in food technology or in biomedicine.

Advantageously, with the at least one separating device a water proportion which is forming the undesired fluid can be removed from diesel fuel comprising at least one additive, wherein the diesel fuel and the at least one additive together form the components of the liquid which in the following is referred to for short as "diesel fuel", for operating an internal combustion engine designed as a diesel engine. The water can be introduced into the diesel fuel by air exchange during filling the tank and/or by tank venting. The water proportion can be critical for modern engines with high pressure injection. Due to the high-pressure pumps, the water can be finely emulsified and can cause in the injection nozzles cavitation and corrosion. Also, the water proportion can cause a biological contamination in the fuel system. These disadvantageous effects can moreover be reinforced in that the free water can be additionally dissolved in the diesel fuel by the high temperatures in the high-pressure system. In fuel circuits, increasing circulation rates of the diesel fuel for cooling the injection components can lead to stronger emulsification and fine dispersion of the water.

Coalescing filter media known from the prior art effect adhesion of finely emulsified water droplets on the filter and cause coalescing and thus enlargement of the water droplets. The water droplets which are enlarged in diameter can then be separated more easily from the fuel flow due to their own weight or assisted by downstream hydrophobic screens with meshes that are smaller than the diameter of the coalesced droplets.

In case that the at least one multi-component liquid contains diesel fuel that has admixed thereto surface-active substances as further components, as is the case for additives and for biodiesel, the surface properties for coalescing media known from the prior art, in particular coalescing filter media, can be changed with increasing contact time with the diesel fuel containing the substances. The function of the coalescing media can thus be affected and possibly even be destroyed. In this context, due to an absorption of surface-active molecules of the substances which are entrained in the diesel fuel, wetting properties of the coalescing media can be changed from hydrophilic behavior to hydrophobic behavior, or vice versa. Also, entrained surface-active agents can cause a reduction of the interfacial tension between water and diesel fuel containing the substances, as well as partially an electrostatic and/or steric stabilization of the emulsion so that the separation principle by droplet coalescence is no longer effective. The reduction of the interfacial tension can have the result that the deformation of the water droplets can increase greatly.

Such problems can occur currently for commercial diesel fuels as they are available at service stations. For commercial diesel fuels, generally composition and the admixture of additives and other types of substances to the fuel are not disclosed by the manufacturer. Also, a quality of the diesel fuel due to the different admixtures can greatly differ regionally as well as seasonally. Different additives are admixed accordingly in so-called summer diesel and winter diesel. Biodiesel proportions can cause also a change of the surface properties of the coalescing media by reaction byproducts of the biodiesel production.

Also, additives can be admixed to the diesel fuel which are to promote and assist the water separation and water droplet coalescence. Such a water separation can be realized on quickly breaking water/diesel emulsions when the system, in the state at rest, is provided with the opportunity for droplet contact. However, with a corresponding minimal interfacial tension and a hydrophobic additive coating of the filter surfaces, coalescence of the water droplets in the fuel system cannot occur. This can be the result of the droplets being able to push through the filter medium without contact with the filter surface.

The invention can be used also for separation of water and/or fuel from oil, in particular motor oil. The water and the fuel are in this context the undesired fluids to be separated. The oil is part of the multi-component liquid. It can be loaded advantageously with at least one adjuvant, in particular additive. The at least one membrane can be operated according to the dead-end flow-through principle or according to the cross-flow principles. The water and/or the fuel can pass in both operating modes through the at least one membrane while the oil and further components of the liquid are retained. The multi-component oil can flow past or along the at least one membrane. Alternatively, in both operating modes the water and/or fuel can be retained by the at least one membrane and the oil can pass through the at least one membrane.

Advantageously, the separation of the at least one undesired fluid, in particular water/fuel, from the at least one liquid, in particular motor oil, can be realized by a separation in the liquid state or in the vapor state.

Advantageously, the water and/or the fuel can coalesce on the surface of the at least one membrane and can be separated in the liquid state.

Advantageously, the water and/or the fuel can be separated in the vapor phase, in particular by heating or applying low pressure, in particular vacuum, at the permeate side.

Advantageously, the multi-component oil can be retained at a membrane side, in particular an inner membrane side. The water and/or the fuel can be separated by the at least one membrane. This can be of great advantage in particular in fields of use with high water contents in the oil, in particular in marine engines.

A water proportion in the motor oil which can be produced by condensation in the exhaust gas at low temperatures in the internal combustion engine can be critical for the internal combustion engine. With the introduction of water, the viscosity and thus also the lubricating properties of the motor oil can be reduced. Moreover, rust formation and bacteria growth may occur. In addition to the disadvantageous effects which can have direct effects on the motor, also indirect problems may occur. The water in the motor oil can cause swelling of oil filter materials and can thus cause a deterioration of the separating performance of particles.

Fuel can be introduced by blowby gas into the motor oil and can condense therein at low temperatures in the internal combustion engine. Like water, fuel can cause also a reduction of the viscosity of the motor oil with the aforementioned disadvantages. However, upon introduction of biodiesel fuel into the motor oil, an increase of the viscosity by chemical polymerization reactions of the motor oil may occur causing a reduction of the lubrication performance of the motor.

By separation of the water and the fuel from the oil, the viscosity of the oil can be maintained. Corrosion and bacteria growth can be reduced, in particular prevented. Moreover, swelling of materials used in an oil filter can be reduced, in particular prevented.

Advantageously, the invention can be used in internal combustion engines in which, in particular due to short operating periods, the optimal oil temperature is not always reached and therefore an increased water proportion and/or fuel proportion may be existing in the motor oil. Thus, the invention can be used in so-called hybrid vehicles which comprise in addition to an internal combustion engine a further drive sources, in particular an electric motor. Here, it may happen that the internal combustion engine, in particular when driving short distances, does not reach the optimal oil temperature.

In an advantageous embodiment, the at least one membrane can be equally permeable to at least one liquid comprising liquid fuel or oil with at least one substance that is affecting in particular the properties of the fuel or oil, in particular an additive. In this way, fuel or oil that is provided with a substance can be separated from at least one undesired fluid.

In a further advantageous embodiment, the at least one membrane can be permeable to at least one undesirable fluid containing water and impermeable to the at least one multi-component liquid, or vice versa. In this way, the at least one multi-component liquid and the at least one undesired fluid containing water can be separated from each other.

In a further advantageous embodiment, the at least one membrane can be permeable to at least one liquid multi-component operating medium of an internal combustion engine and impermeable to at least one undesired fluid containing in particular water, or vice versa. In this way, the at least one membrane can be used for separating corresponding operating media of the internal combustion engine and the at least one undesired fluid.

Multi-component operating media can be in particular liquid fuels or lubricants, in particular motor oil, with additives.

Alternatively or additionally, the at least one membrane can be permeable to at least one liquid multi-component operating medium, in particular motor oil, and impermeable to a further operating medium, in particular fuel, of the internal combustion engine, or vice versa. Accordingly, the operating media can be separated from each other. In particular, fuel possibly contained in motor oil of a motor oil circuit can be separated. In addition or alternatively, water contained in the motor oil can be separated.

In a further advantageous embodiment, the at least one membrane can be permeable to at least one liquid hydrocarbon, in particular with at least one C6, C8, C10 and/or C12 hydrocarbon, particular at least one aromatic hydrocarbon, in particular benzene, and impermeable to at least one undesired fluid containing in particular water, or vice versa. Such liquid hydrocarbons are often used in connection with internal combustion engines. They can be used as operating medium, in particular fuel or lubricant.

In a further advantageous embodiment, the at least one membrane can be attractive or repellent, in particular hydrophilic or hydrophobic, to at least one undesired fluid.

Advantageously, the at least one membrane can be attractive to the at least one undesired fluid. The at least one undesired fluid can thus flow through the at least one membrane. Correspondingly, the at least one membrane can be repellent to the at least one multi-component liquid so that the latter can be retained.

Conversely, the at least one membrane can be repellent to the at least one undesired fluid. In this way, the at least one undesired fluid can be retained by the membrane. Correspondingly, the at least one membrane can be attractive to the at least one multi-component liquid so that the latter can flow through the at least one membrane.

Advantageously, the at least one membrane can be hydrophilic or hydrophobic. In this way, the at least one undesired fluid e.g. water can be separated from the at least one multi-component liquid.

In a further advantageous embodiment, at least one property of the at least one membrane, in particular surface property, pore size, porosity, repellent effect and/or attraction effect relative to the at least one multi-component liquid and/or relative to the at least one undesired fluid can be predetermined for predetermining the respective permeability to the at least one liquid and the at least one undesired fluid. In this way, the at least one membrane can be designed demand-oriented for the at least one liquid and the at least one undesired fluid. In this way, separation of the at least one undesired fluid can be improved.

By adaptation of surface properties, in particular the adjustment of hydrophilic/hydrophobic properties or a use of selective membranes, the separation of undesired fluids can be further optimized.

Surface properties of the at least one membrane can be changed in particular by coating. When using polymer membranes, the surface properties can be affected by grafting with copolymers. Also, surface properties of the at least one membrane can be changed by plasma treatment.

In particular organic polymers and/or inorganic materials, in particular ceramic, more particular oxide ceramic, or carbide materials, can be used as membrane materials.

In a further advantageous embodiment, a shape, in particular form and/or expansion, of the at least one membrane can be predetermined. In particular, the at least one membrane can be designed as a hollow fiber membrane or hollow fiber membrane structure or flat membrane. In this way, the at least one membrane can be matched to a construction and/or function of the separating device. In this way, the separating efficiency can be further improved.

Advantageously, the at least one membrane can be designed as a hollow fiber membrane. In this context, an interior of the hollow fiber membrane can be connected with an inlet for the at least one multi-component liquid. An exterior surrounding the hollow fiber membranes can be connected with an outlet for the at least one liquid. Conversely, an exterior can be connected with the inlet and an interior can be connected with the outlet. The at least one hollow fiber membrane can thus be operated according to the dead-end flow-through principle.

Instead, an opening of the interior of the hollow fiber membrane can be connected with the inlet. The oppositely positioned opening of the interior of the hollow fiber membrane can be connected with an outlet. The exterior surrounding the hollow fiber membrane can be connected with a drain for the undesired fluid to be separated. In this way, the at least one hollow fiber membrane can be operated according to the cross-flow principle.

Advantageously, several hollow fiber membranes can be combined in particular to a hollow fiber membrane structure.

Alternatively, the at least one membrane can be designed as a flat membrane. A flat membrane has no interior. The at least one flat membrane can be designed areally. The at least one flat membrane can be operated according to the cross-flow principle or according to the dead-end flow-through principle.

The at least one separating device can also comprise a combination of several, in particular different, membranes.

The object is further solved according to the invention by the membrane in that the membrane can be arranged in a region that is flowed through by at least one multi-component liquid so that it can separate a first fluid region from a second fluid region, wherein the membrane, on the one hand, has different permeability to the at least one undesired fluid and the liquid with all its components and, on the other hand, is equally permeable to all components of the liquid.

The object is further solved according to the invention by the filter in that the separating device, in a region which is flowed through by at least one multi-component liquid, comprises at least one membrane which separates a first fluid region from a second fluid region, wherein the at least one membrane, on the one hand, has different permeability to the at least one undesired fluid and the liquid with all its components and, on the other hand, is equally permeable to all components of the liquid.

The object is also solved by the filter element in that the filter element comprises at least one membrane of the separating device which is arranged in a region of the filter flowed through by the at least one multi-component liquid in such a way that it can separate a first fluid region from a second fluid region, wherein the at least one membrane, on the one hand, has different permeability to the at least one undesired fluid and the liquid with all its components and, on the other hand, is equally permeable to all components of the liquid.

The object is finally solved by the fluid system in that the separating device comprises, in a region flowed through by at least one multi-component liquid, at least one membrane which separates a first fluid region from a second fluid region, wherein the at least one membrane, on the one hand, has different permeability to the at least one undesired fluid and the liquid with all its components and, on the other hand, is equally permeable to all components of the liquid.

The features and advantages which have been described in connection with the separating device according to the invention, the membrane according to the invention, the filter according to the invention, the filter element according to the invention, and the liquid system according to the invention and their respective advantageous embodiments apply likewise among each other and vice versa. The individual features and advantages can, of course, be combined among each other wherein further advantageous effects may result that go beyond the sum of the individual effects.

BRIEF DESCRIPTION OF THE DRAWINGS

Further advantages, features, and details of the invention result from the following description in which embodiments of the invention will be explained in more detail with the aid of the drawing. A person of skill in the art will consider the features disclosed in combination in the drawing, the description, and the claims expediently also individually and combine them to meaningful further combinations.

FIG. 2 is a detail view of a separating membrane of the separating device of FIG. 1.

FIG. 3 is a detail view of a main fuel filter according to a second embodiment, comprising a separating device for water operating according to the cross-flow principle, wherein the main fuel filter is similar to the main fuel filter of FIG. 1 and can be used in the fuel system shown in FIG. 1.

FIG. 4 is a detail view of the separating membrane of the separating device of FIG. 3.

Same components are provided with same reference characters in the Figures.

DESCRIPTION OF PREFERRED EMBODIMENTS

Figure 1:
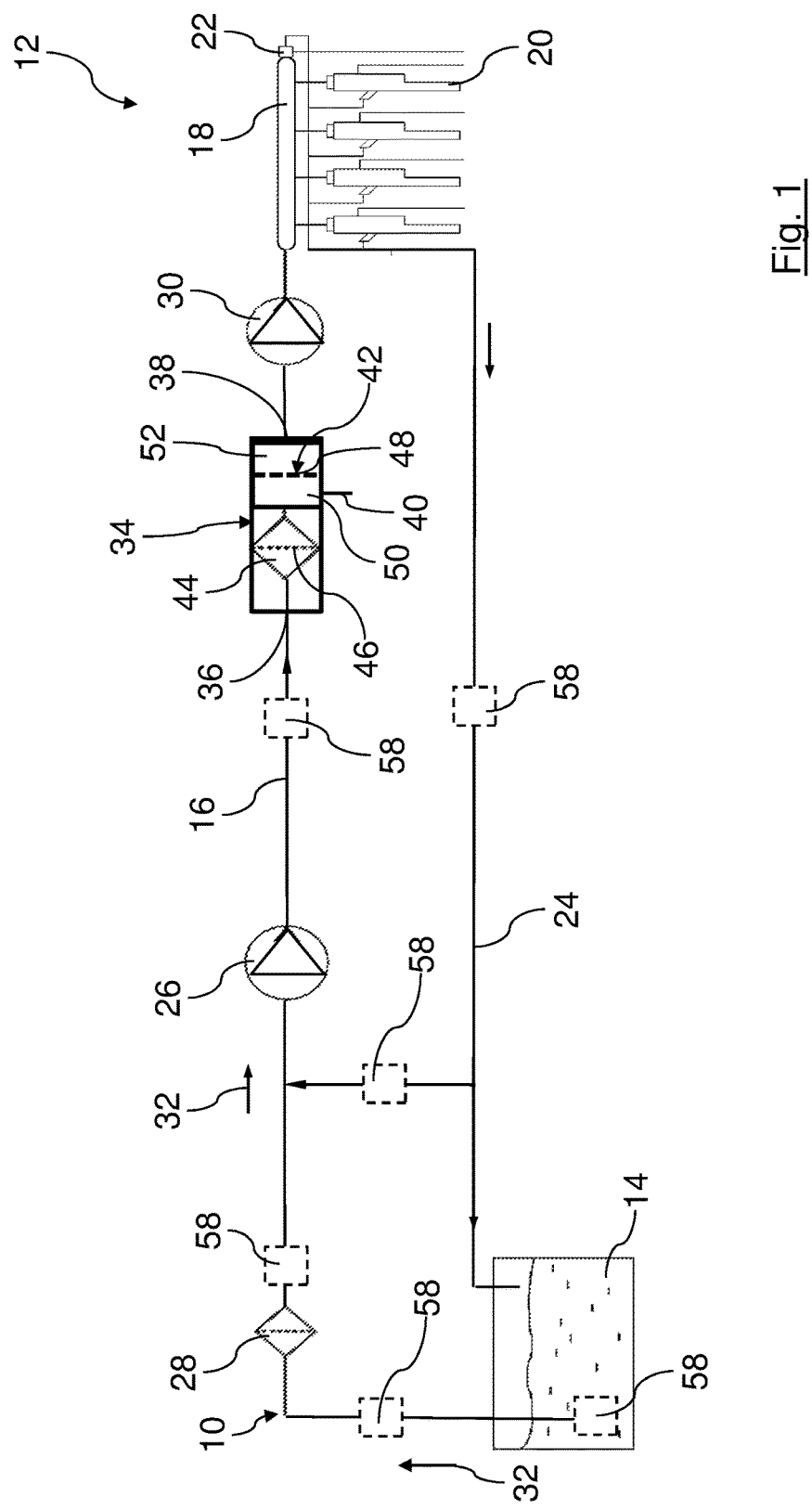
FIG. 1 shows a fuel system of a diesel engine with a common rail injection, comprising a main fuel filter according to a first embodiment which comprises a separating device for water from diesel fuel, operating according to the dead-end flow-through principle.

In FIG. 1, a fuel system 10 of an internal combustion engine, referenced as a whole by 12, of a motor vehicle is shown. The internal combustion engine 12 is a diesel engine comprising an accumulator fuel injection system, a so-called common rail injection. The diesel fuel is provided with an additive for improving the fuel properties and thus is a multi-component substance. In the following, the multi-component liquid comprised of the diesel fuel and the additive, for reasons of simplicity, is referred to as "diesel fuel" for short.

The fuel system 10 comprises a fuel tank 14 for the diesel fuel. The fuel tank 14 is connected by a fuel line 16 with a distributor pipe 18 of the injection system. From the distributor pipe 18 corresponding lines are extending in an exemplary fashion to the four injectors 20 of the injection system.

A return line 24 is extending away from the pressure control valve 22 provided at the distributor pipe 18. The return line 24 is branching. The first branch opens into the fuel tank 14. A second branch of the return line 24 opens into the fuel line 16.

A fuel feed pump 26 is located in the fuel line 16. Between the fuel tank 14 and the fuel feed pump 26, a prefilter 28 for pre-filtering the diesel fuel is arranged. The second branch of the return line 24 opens between the prefilter 28 and the fuel feed pump 26 into the fuel line 16. The conduit section between the fuel tank 14 and the fuel feed pump 26 is referred to as intake side. In operation, a pressure of approximately 0.2 bar may exist at the intake side.

Fluidically between the fuel feed pump 26 and the distributor pipe 18, a high-pressure pump 30 for the diesel fuel is arranged in the fuel line 16. A fuel flow direction in the fuel line 16 is indicated with arrows 32.

Between the fuel feed pump 26 and the high-pressure pump 30, a main fuel filter 34 for the diesel fuel is arranged in the fuel line 16.

The conduit section between the fuel feed pump 26 and the high-pressure pump 30 is referred to as pressure side. In operation of the internal combustion engine 12, a pressure of greater than approximately 5 bar may exist here. The region of the fuel supply system 10 downstream of the high-pressure pump 30 is referred to as high pressure side.

The high-pressure side is limited by the pressure control valve 22. In operation of the internal combustion engine, in the return line 24, fluidically downstream of the pressure control valve 22, a pressure of less than approximately 1.5 bar may exist.

The main fuel filter 34 comprises a filter housing with an inlet 36 for the diesel fuel and possibly entrained water and an outlet 38 for the filtered diesel fuel. Moreover, the filter housing comprises a water drain 40 of a water separating device 42. Through the water drain 40, water that has been separated by the water separating device 42 from the diesel fuel can be drained from the main fuel filter 34.

In the filter housing, a filter element 44 is arranged such that it separates the inlet 36 from the outlet 38. The filter element 44 comprises a filter medium 46 which is indicated in dashed lines in FIG. 1. In operation of the internal combustion engine 12, the diesel fuel and possibly entrained water can flow through the filter medium 46 whereby possibly contained particles are filtered out.

Moreover, the filter element 44 comprises a separator membrane 48 which is part of the water separating device 42. The separator membrane 48 is illustrated in detail in FIG. 2. The separator membrane 48 is arranged fluidically between the filter medium 46 and the outlet 38. It separates a water collecting chamber 50 from a downstream outlet chamber 52. The water collecting chamber 50 is located between the filter medium 46 and the separator membrane 48. The outlet chamber 52 is located between the separator membrane 48 and the outlet 38.

The separator membrane 48 is made of hydrophobic material. It is impermeable to water. On the other hand, the separator membrane 38 is equally permeable to all components of the diesel fuel, i.e., the diesel fuel and the additive. The permeability to the diesel fuel and the impermeability to water is predetermined by appropriate surface properties, for example, pore size, porosity, attraction effect on diesel fuel and additive, repellent effect on water, and the like. The separator membrane 48 is designed as a flat membrane. It is flowed against approximately perpendicularly by the diesel fuel and the water and the diesel fuel passes through it. The flat membrane is open. In contrast to this, hollow fiber membranes are closed and surround circumferentially an interior.

In operation of the internal combustion engine 12, the diesel fuel and water possibly contained therein is sucked by means of the fuel feed pump 26 from the fuel tank 14 into the fuel line 16. The diesel fuel and the water flow first through the prefilter 28 where possibly contained larger particles are filtered out.

The diesel fuel and the water pass into the fuel feed pump 26 and are subsequently pumped through the main fuel filter 34. The diesel fuel and the water flow through the filter medium 46 where further particles are filtered out.

The filtered diesel fuel with the water reaches the water collecting chamber 50. The diesel fuel inclusive the additive flows through the separator membrane 48 and reaches the outlet chamber 52 downstream. The separator membrane 48 is operated in accordance with the so-called dead-end flow-through principle so that it is mandatorily flowed through by the diesel fuel. In FIG. 2, the diesel fuel is indicated with solid arrows 54.

The diesel fuel exits the outlet chamber 52 through the outlet 38 and is supplied to the high-pressure pump 30. By means of the high-pressure pump 30, the diesel fuel is loaded with the appropriate pressure and fed to the distributor pipe 18. With the latter, the diesel fuel is distributed onto the four injectors 20. Diesel fuel that is not needed by the injectors 20 is returned by pressure control valve 22 through the return line 24 to the fuel line 16 or to the fuel tank 14, as needed.

Water possibly contained in the diesel fuel is retained in the main fuel filter 34 by the separator membrane 48. It collects in the water collecting chamber 50 and can be drained by means of the water drain 40. The water is indicated in FIG. 2 by dashed arrows 56.

In FIG. 3, a main fuel filter 34 according to a second embodiment is illustrated. The separator membrane 48 according to the second embodiment is illustrated in detail in FIG. 4. Those elements that are similar to those of the first embodiment according to FIGS. 1 and 2 are provided with the same reference characters. In contrast to the first embodiment, the separator membrane 48 does not separate the filter medium 46 from the outlet 38. Instead, the outlet chamber 52 connects the outflow side of the filter medium 46 with the outlet 38. The separator membrane 48 separates the outlet chamber 52 and the outflow side of the filter medium 46 from the water collecting chamber 50. The water collecting chamber 50 is connected with the water drain 40. In the second embodiment, the water collecting chamber 50 and the outlet chamber 52 are not arranged one after the other relative to the fuel flow. In the second embodiment, the separator membrane 48 is operated according to the cross-flow principle.

The separator membrane 48 according to the second embodiment is made of hydrophilic material. It is permeable to the water that is entrained in the diesel fuel. On the other hand, the separator membrane 48 according to the second embodiment is equally impermeable to the diesel fuel with the corresponding additive. The diesel fuel and the additive are therefore retained by the separator membrane 48.

In operation of the internal combustion engine, the diesel fuel with water possibly contained therein flows in analogy to the first embodiment through the inlet 36 into the main fuel filter 34. The diesel fuel and the water flow through the filter medium 46 and reach the outlet chamber 52. The diesel fuel with the additive flows, as indicated in FIG. 4 by arrows 54, along the separator membrane 48 and reaches the outlet 38. The diesel fuel exits from the main fuel filter 34.

The water contained in the diesel fuel flows through the separator membrane 48 and reaches, as indicated in FIG. 4 by dashed arrows 56, the water collecting chamber 50. From here, the collected water can be drained through the water drain 40 in analogy to the first embodiment.

In addition or alternatively, in the fuel system 10 of the embodiments according to FIGS. 1 through 4, one or more water separating devices in accordance with the water separating device 42 can be arranged in fuel-conducting lines at other locations 58 which are indicated in FIG. 1 as squares in dashed lines.

For example, a water separating device can be arranged in the fuel tank 14. A water separating device can be arranged in the fuel line 16 between the fuel tank 14 and the prefilter 28, between the prefilter 28 and the fuel feed pump 26, or between the fuel pump 26 and the main fuel filter 34.

Alternatively or in addition, a water separating device can be arranged in the return line 24 between the pressure control valve 22 and the branch or between the branch and the fuel line 16.

For example, the prefilter 28 can also be provided, additionally or alternatively, with a water separating device which can be similar to the water separating device 42 of the main fuel filter 34 according to one of the two embodiments.

Figure 5:
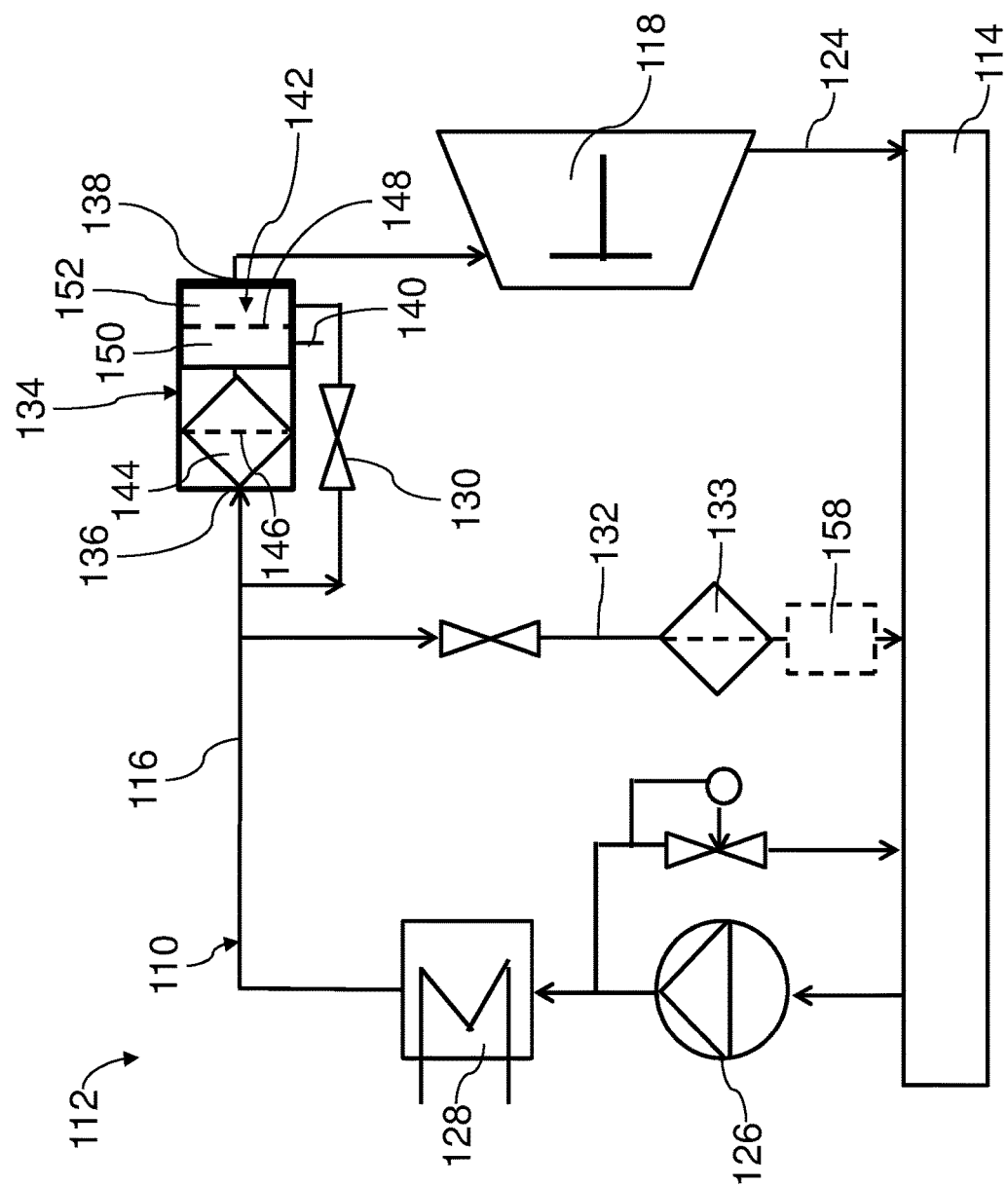
FIG. 5 is a motor oil circuit of an internal combustion engine of a motor vehicle comprising a main oil filter which comprises a separating device for separating water from the motor oil, wherein the separating device is similar to the separating devices of FIGS. 1 to 3.

In FIG. 5, a motor oil circuit 110 of an internal combustion engine 112 in the form of a diesel engine is illustrated.

The motor oil circuit 110 comprises an oil sump 114 in which motor oil can be collected in a way not of interest here. The motor oil is provided with an additive which forms a second component of the motor oil and with which the properties of the motor oil are improved. In the following, the motor oil with the additive is referred to as "motor oil" for short.

An oil supply line 116 is extending from the oil sump to the motor 118. A return line 124 leads from the motor 118 back to the oil sump 114. An oil pump 126, an oil cooler 128, and an oil filter 134 are arranged one after another in the oil supply line 116 in flow direction of the motor oil. A bypass valve 130 is arranged parallel to the main oil filter 134.

Fluidically, upstream of the main oil filter 134, an auxiliary oil line 132 is branching off and extends to the oil sump 114. An auxiliary oil filter 133 is arranged in the auxiliary oil line 132.

The main oil filter 134 in regard to function and configuration is similar to the main fuel filter 34 of the fuel system 10 of FIG. 1. It comprises a filter housing with an inlet 136 and an outlet 138 for the motor oil. Moreover, the filter housing comprises a fuel/water drain 140 for draining possibly contained water and fuel which are separated from the motor oil by means of a fuel/water separating device 142. Between the inlet 136 and the outlet 138, an oil filter element 144 is arranged such that it separates the inlet 136 from the outlet 138. The oil filter element 144 comprises a filter medium 146 and a separator membrane 148 of the fuel/water separating device 142.

The fuel/water separating device 142 is operated according to the dead-end flow-through principle in analogy to the water separating device 42 of the fuel system 10 of FIGS. 1 and 2. The separator membrane 148 separates a fuel/water collecting chamber 150 from an outlet chamber 152. The separator membrane 148 is permeable to the motor oil inclusive additive and is impermeable to the water possibly contained therein and the possibly present fuel.

In operation of the internal combustion engine 112, the motor oil and water and fuel possibly contained therein are sucked in from the oil sump 114 by the oil pump 126 and pumped through the oil cooler 128 to the main oil filter 134. The motor oil, the water, and the fuel pass through inlet 136 into the filter housing. Motor oil, water, and fuel pass through the filter medium 146, are freed from particles, and reach the water collecting chamber 150. The motor oil inclusive additive flows through the separator membrane 148 and reaches the outlet chamber 152.

The purified motor oil that has been freed from water/fuel exits the filter housing through outlet 138 from the outlet chamber 152 and is supplied to locations of use of the motor 118 which are not of interest here. The motor oil flows out of the motor 118 via the return line 124 back into the oil sump 114.

In an alternative embodiment, not illustrated in the Figures, of the main oil filter 134 of the motor oil circuit 110, a fuel/water separating device 142 according to a further embodiment can be operated according to the cross-flow principle analog to the water separating device 42 of the fuel system 10 of FIGS. 3 and 4 in accordance with the second embodiment thereof. In this context, the separator membrane 148 is permeable to the water and the fuel and is impermeable accordingly for the motor oil with the additive.

In analogy to the fuel systems 10 of FIGS. 1 to 4, the motor oil circuits 110 in addition or alternatively can comprise at other locations 158 one or more fuel/water separating devices in accordance with the water separating device 42. For example, in the auxiliary oil line 132 between the auxiliary oil filter 133 and the oil sump 114, a fuel/water separating device can be arranged. The fuel/water separating device can also be combined with the auxiliary oil filter 133.

Also, corresponding separating devices for water from the motor oil and for fuel from the motor oil can be provided separate from each other in the motor oil circuit 110.

The (fuel)/water separating devices can be combined in the embodiments with an appropriate fuel filter or motor oil filter or can be integrated therein. They can also be arranged as separate component group, in particular independent of the corresponding fuel filters or motor oil filters.

What is claimed is:

1. A separating device for separating at least one undesired liquid fluid from a liquid composition to be treated, the liquid composition comprising the at least one undesired liquid fluid and the at least one multi-component liquid, the separating device comprising:
    an interior region flowed through by the at least one multi-component liquid;
    a plurality of hollow fiber membranes connected together in combination to form a hollow fiber membrane structure of the plurality of hollow fiber membranes in the separating device, the plurality of hollow fiber membranes disposed in the region in the interior region of the separating device and arranged to separate a first fluid region from a second fluid region within the interior region of the separating device;
    wherein the plurality of hollow fiber membranes comprise:
        a first permeability to the at least one undesired liquid fluid and
        a second permeability to the at least one multi-component liquid,
        wherein the first permeability is different from the second permeability;
        wherein the at least one membrane is configured to be equally permeable to all components of the at least one multi-component liquid;
        wherein the plurality of hollow fiber membranes is configured to be permeable to the at least one multi-component liquid and is configured to be impermeable to the at least one undesired liquid fluid, or the plurality of hollow fiber membranes is configured to be impermeable to the at least one multi-component liquid and is configured to be permeable to the at least one undesired liquid fluid,
        wherein the plurality of hollow fiber membranes is hydrophilic or hydrophobic,
    wherein the at least one multi-component liquid is a liquid multi-component operating medium.

2. The separating device according to claim 1, wherein the plurality of hollow fiber membranes is configured to be equally permeable to all the components of the liquid multi-component operating medium comprising a liquid fuel or oil
and wherein the plurality of hollow fiber membranes further comprise at least one additive that influences properties of the liquid fuel or oil.

3. The separating device according to claim 1, wherein the plurality of hollow fiber membranes is configured to be permeable to the at least one undesired liquid fluid that is containing water and is configured to be impermeable to the liquid multi-component operating medium.

4. The separating device according to claim 3, wherein the plurality of hollow fiber membranes is arranged to be flowed against by the liquid multi-component operating medium according to a cross-over flow principle or a cross-flow principle.

5. The separating device according to claim 4, wherein the first fluid region is connected with an inlet for the liquid multi-component operating medium and is connected with an outlet for the liquid multi-component operating medium and wherein the second fluid region comprises a drain for draining the at least one undesired fluid from the second fluid region.

6. The separating device according to claim 1, wherein the plurality of hollow fiber membranes is configured to be impermeable to at least one undesired liquid fluid that is containing water and is configured to be permeable to the liquid multi-component operating medium.

7. The separating device according to claim 6, wherein the plurality of hollow fiber membranes is arranged to be flowed through by the liquid multi-component operating medium according to a dead-end flow-through principle.

8. The separating device according to claim 7, wherein the first fluid region is connected with an inlet for the liquid multi-component operating medium and the second fluid region is connected with an outlet for the liquid multi-component operating medium, wherein the first fluid region comprises a drain for draining the at least one undesired liquid fluid from the first fluid region.

9. The separating device according to claim 1, wherein the at least one undesired liquid fluid contains water and wherein the liquid multi-component operating medium contains at least one liquid hydrocarbon, wherein the plurality of hollow fiber membranes is configured to be permeable to the at least one liquid hydrocarbon and impermeable to the at least one undesired liquid fluid, or the plurality of hollow fiber membranes is configured to be impermeable to the at least one liquid hydrocarbon and permeable to the at least one undesired liquid fluid.

10. The separating device according to claim 1, wherein the plurality of hollow fiber membranes is configured to be attractive or repellent to the at least one undesired liquid fluid.

11. The separating device according to claim 1, wherein one or more properties of the plurality of hollow fiber membranes at are predetermined for predetermining the first and second permeabilities, wherein the one or more properties are selected from the group consisting of a surface property, pore size, porosity, a repellent effect relative to the liquid multi-component operating medium and/or relative to the at least one undesired liquid fluid, and an attractive effect relative to the liquid multi-component operating medium and/or relative to the at least one undesired liquid fluid.

12. The separating device according to claim 1, wherein the hollow fiber membrane structure has a predetermined shape.

13. A filter for at least one multi-component liquid, the filter comprising
a separating device for separating at least one undesired liquid fluid from a composition to be treated, the composition comprising the at least one undesired fluid and the at least one multi-component liquid,
wherein the separating device comprises an interior region flowed through by the at least one multi-component liquid;
wherein the separating device further comprises a plurality of hollow fiber membranes connected together in combination to form a hollow fiber membrane structure of the plurality of hollow fiber membranes in the separating device, the plurality of hollow fiber membranes disposed in the interior region and arranged to separate a first fluid region from a second fluid region;
wherein the plurality of hollow fiber membranes comprise:
a first permeability to the at least one undesired liquid fluid and
a second permeability to the at least one multi-component liquid,
wherein the first permeability is different from the second permeability, and
wherein the plurality of hollow fiber membranes is configured to be equally permeable to all components of the at least one multi-component liquid,
wherein the plurality of hollow fiber membranes is hydrophilic or hydrophobic.

14. A filter element of a filter for filtering a composition to be treated, the composition comprising at least one undesired liquid fluid and at least one multi-component liquid, the filter element configured to be arranged in the filter such that the filter element separates an inlet of the filter from an outlet of the filter, the filter element comprising:
a filter medium configured to be flowed through by the at least one multi-component liquid and at least one undesired liquid fluid;
at least one part of a separating device for separating the at least one undesired liquid fluid from the at least one multi-component liquid;
wherein the at least one part of the separating device is a plurality of hollow fiber membranes connected together in combination to form a hollow fiber membrane structure,
wherein the hollow fiber membrane structure is configured to be arranged in a region of the filter flowed through by the at least one multi-component liquid in such a way that the plurality of hollow fiber membranes separates a first fluid region from a second fluid region.

15. The filter element according to claim 14, wherein the at least one membrane comprises
a first permeability to the at least one undesired liquid fluid and
a second permeability to the at least one multi-component liquid,
wherein the first permeability is different from the second permeability, and
wherein the at least one membrane is configured to be equally permeable to all components of the at least one multi-component liquid.

16. The filter element according to claim 14, wherein the at least one multi-component liquid is diesel fuel, wherein the at least one undesired liquid fluid is water, and wherein the filter medium is a particle filter medium.

17. A liquid system comprising
at least one separating device for separating at least one undesired fluid from a composition to be treated, the composition comprising the at least one undesired liquid fluid and at least one multi-component liquid,
the at least one separating device comprises a region flowed through by the at least one multi-component liquid and a plurality of hollow fiber membranes connected in combination to form a hollow fiber membrane structure disposed in the region and arranged to separate a first fluid region from a second fluid region;

wherein the plurality of hollow fiber membranes is hydrophilic or hydrophobic, wherein the plurality of hollow fiber membranes comprise a first permeability to the at least one undesired liquid fluid and a second permeability to the at least one multi-component liquid, wherein the first permeability is different from the second permeability, and wherein the plurality of hollow fiber membranes is configured to be equally permeable to all components of the at least one multi-component liquid.

\* \* \* \* \*